United States Patent [19]

Warner

[11] Patent Number: 4,952,442

[45] Date of Patent: Aug. 28, 1990

[54] AUTOMOBILE SEAL

[75] Inventor: Douglas L. Warner, Marion, Ind.

[73] Assignee: GenCorp Inc., Fairlawn, Ohio

[21] Appl. No.: 432,400

[22] Filed: Nov. 6, 1989

[51] Int. Cl.$^5$ ................................................ E06B 7/16
[52] U.S. Cl. ...................................... 428/83; 49/490; 52/716; 428/122; 428/358
[58] Field of Search .................... 428/122, 358, 83; 52/716; 49/490

[56] References Cited

U.S. PATENT DOCUMENTS

| 3,260,887 | 7/1966 | Alexander et al. | 315/9 |
| 3,333,364 | 8/1967 | Herr | 49/490 X |
| 3,360,887 | 1/1968 | Parks et al. | 428/166 X |
| 4,143,497 | 3/1979 | Offenbacher | 49/490 X |
| 4,348,443 | 9/1982 | Hein | 428/122 |
| 4,603,899 | 8/1986 | Iwasa | 428/122 X |
| 4,695,499 | 9/1987 | Whitener | 428/122 |
| 4,756,944 | 7/1988 | Kisanuki | 428/358 X |
| 4,830,898 | 5/1989 | Smith | 428/122 |
| 4,835,031 | 5/1989 | Schroder et al. | 428/122 |

*Primary Examiner*—Henry F. Epstein

[57] ABSTRACT

A seal is described for sealing the space between the trunk compartment of an automobile and the decklid covering the compartment. The seal comprises a rubber channel which has a plurality of fingers which coact with a nib carrying half-moon protuberance to firmly grip an outstanding flange which extends around the opening of the trunk compartment.

8 Claims, 1 Drawing Sheet

U.S. Patent     Aug. 28, 1990     4,952,442
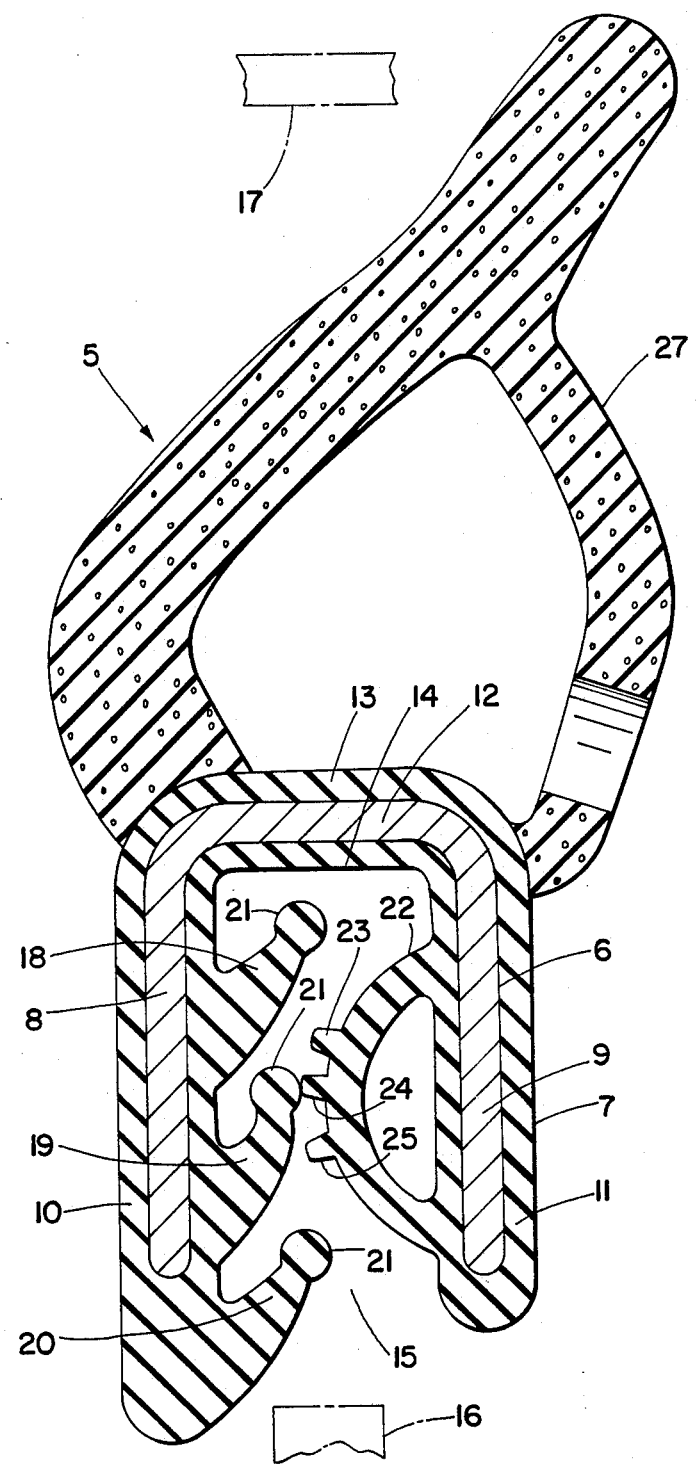

AUTOMOBILE SEAL

BACKGROUND OF INVENTION

The invention relates to automobile seals, especially a seal that is used between the rear trunk compartment of an automobile and the decklid covering the compartment.

One of the decklid seals presently used has a U-shaped channel which is like that shown in U.S. Pat. Nos. 4,348,443 and 4,143,497 in that a number of similarly designed resilient fingers are employed to grip an outstanding flange which extends around the trunk compartment. It has been found that in cases of severe curvature, e.g. 90° corners, the resilient fingers tend to collapse against each other and the adjacent legs of the channel somewhat like the positions of the fingers 21 shown in FIG. 3 of U.S. Pat. No. 4,830,898. This has an adverse effect on the seal which has been found to leak occasionally. The invention is directed to providing a highly improved seal in which leakage is eliminated.

Briefly stated, the invention is in the, seal of a trunk lid or deck lid which comprises a U-shaped piece of metal which is embedded in, and coextensive with a similarly shaped rubber channel which has a pair of legs that are connected by a web. Further, a plurality of resilient fingers extend inwardly of one of the legs in the direction of the other leg and web. On the other leg opposite the fingers, is a hollow half-moon-shaped bulbous portion which extends inwardly towards the opposing fingers. Unlike the bulbous portions 32-34 of U.S. Pat. No. 3,333,364 which have smooth outer curved surfaces, the bulbous portion is provided with a number of outwardly extending nibs which coact with the fingers to firmly grip the outstanding flanges of the trunk compartment and seal the spaces between the flange and legs of the rubber channel.

DESCRIPTION OF DRAWING

The following description of the invention will be better understood by having reference to the accompanying drawing which is a cross-section of a trunk lid seal 5 which is made in accordance with the invention. The seal 5 comprises a U-shaped metal conduit 6 which is embedded in a similarly shaped resilient rubber channel 7, both of which are coextensive with the length of the seal 5.

The metal conduit 6 and rubber channel 7 have opposing parallel legs 8, 9 and 10, 11 which are connected by webs 12 and 13 to form a metal reinforced rubber channel 7 which has a closed end 14 opposite an open end 15 which is designed to receive a metal flange 16, shown in dotted line, which extends around the opening of the trunk compartment in the direction of the trunklid or decklid 17 which is rotatable into and out of covering relation with the trunk compartment.

A plurality of longitudinally extending, tapering resilient rubber fingers 18-20 with similar bulbous outer extremities 21 extend angularly from the inboard leg 10 of the channel 7, closest the opening of the trunk compartment, inwardly of the channel 7 in the direction of the web 13 and opposite outboard leg 11 of the channel 7 fronting exteriorly of the trunk opening.

A hollow half-moon shaped resilient, rubber protuberance or gripper 22 extends from the outboard leg 11 of the channel 7 towards the opposing fingers 18-20, and has a plurality of solid rubber nibs 23-25 projecting from the outer curved surface of the gripper 22 towards the fingers 18-20 to increase the gripping action of the gripper 22 with the trunk compartment flange 16. The nibs 23-25 have a frusto-conically shaped cross-section, unlike the pointed ribs 16 shown in U.S. Pat. No. 3,360,887. The fingers 18-20, gripper 22 and nibs 23-25 are integrally formed with the rubber channel 7 of the same rubbery material.

A hollow resilient bulb 27 extends outwardly from the web 13 of the channel 7 in opposed relation from the fingers 18-20 and the gripper 22. The bulb 27 is composed of any suitable sponge rubber which is softer and more pliable than the rubber of channel 7. The bulb 27 has any suitable shape for making sealing engagement with the deck lid 17.

Thus, there has been described a unique seal which utilizes an unusual combination of resilient fingers and gripper with nibs to provide a highly improved gripping and sealing action to substantially eliminate leakage between the decklid and trunk compartment. It has been found that the semicylindrical gripper will not collapse like the resilient fingers heretofor used.

What is claimed is:

1. An automobile seal, comprising:
    (a) a U-shaped metal conduit embedded in a correspondingly shaped rubber channel for receiving an outstanding flange around an opening to be covered and sealed from the ambient atmosphere, the conduit and channel being substantially coextensive with the flange, the channel having a pair of legs for straddling the flange and a web for connecting the legs and covering the free distal end of the flange;
    (b) a plurality of resilient rubber fingers extending angularly from one of the legs towards the web and other opposing leg;
    (c) a single, hollow half-moon shaped rubber protuberance extending from the other leg in the direction of the fingers, the fingers and protuberance being coextensive with the legs; and
    (d) means carried by the protuberance in close proximity to the fingers and coacting with the fingers to grip the flange therebetween.

2. The automobile seal of claim 1, wherein the gripper means includes a plurality of rubber nibs which extend from the protuberance towards the fingers and which are integrally formed with the protuberance.

3. A seal positionable between the trunk compartment of an automobile and the decklid covering the compartment, comprising:
    (a) a U-shaped metal conduit embedded in a correspondingly shaped resilient rubber conduit for receiving an outstanding flange which extends around the opening of the trunk compartment, the conduit and channel being coextensive with the flange, the channel having a pair of opposing legs for straddling the flange and a web which connects the legs and covers the flange between the legs, the leg closest the opening being the inboard leg and the other leg being the outboard leg:
    (b) a plurality of resilient rubber fingers extending angularly from the inboard leg towards the web and outboard leg;
    (c) a single hollow half-moon shaped resilient rubber protuberance extending from the outboard leg towards the fingers and terminating in close proximity thereto, the fingers and protuberance being coextensive with the legs;

(d) means carried by the protuberance and extending therefrom in the direction of the fingers and coacting with the fingers for gripping the flange therebetween; and (e) a hollow rubber bulb secured to the channel and extending therefrom in a direction away from the web and legs for compressive engagement with the decklid when the deck lid is moved to a closed position covering the trunk compartment, the rubber of the bulb being a sponge-type rubber which is softer than the rubber of the channel.

4. The seal of claim 3, wherein the means includes a plurality of nibs projecting from the outer curved surface of the protuberance.

5. The seal of claim 4, wherein the protuberance is hollow and the nibs, protuberance and fingers are integrally formed with the channel.

6. The seal of claim 5, wherein the fingers are tapering being wider at the base thereof and each terminating at a small, solid rubber ball in cross-section.

7. The seal of claim 6, which includes three fingers and three nibs.

8. The seal of claim 7, wherein each nib has a frusto-conically shaped cross-section.

* * * * *